US012580683B2

(12) United States Patent (10) Patent No.: US 12,580,683 B2
Basu Mallick et al. (45) Date of Patent: Mar. 17, 2026

(54) RETRANSMITTING A TRANSPORT BLOCK WITH SIDELINK FEEDBACK NOT ENABLED

(71) Applicant: Lenovo (Singapore) PTE. LTD., New Tech Park (SG)

(72) Inventors: Prateek Basu Mallick, Dreieich (DE); Joachim Loehr, Wiesbaden (DE); Karthikeyan Ganesan, Kronberg im Taunus (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 368 days.

(21) Appl. No.: 17/793,625

(22) PCT Filed: Jan. 16, 2021

(86) PCT No.: PCT/IB2021/050317
§ 371 (c)(1),
(2) Date: Jul. 18, 2022

(87) PCT Pub. No.: WO2021/144764
PCT Pub. Date: Jul. 22, 2021

(65) Prior Publication Data
US 2023/0077779 A1 Mar. 16, 2023

Related U.S. Application Data

(60) Provisional application No. 62/961,821, filed on Jan. 16, 2020.

(51) Int. Cl.
| | |
|---|---|
| *H04L 1/08* | (2006.01) |
| *H04W 72/23* | (2023.01) |
| *H04W 92/18* | (2009.01) |

(52) U.S. Cl.
CPC ............... *H04L 1/08* (2013.01); *H04W 72/23* (2023.01); *H04W 92/18* (2013.01)

(58) Field of Classification Search
CPC ......... H04L 1/1825; H04L 1/08; H04L 1/189; H04L 1/1854; H04W 72/23
See application file for complete search history.

(56) References Cited

U.S. PATENT DOCUMENTS

| | | | |
|---|---|---|---|
| 9,942,918 B2* | 4/2018 | Rapaport | H04L 65/65 |
| 2013/0163536 A1* | 6/2013 | Anderson | H04L 5/0007 |
| | | | 370/329 |

(Continued)

OTHER PUBLICATIONS

PCT/IB2021/050317, "Notification of Transmittal of the International Search Report and the Written Opinion of the International Searching Authority, or the Declaration", Mar. 18, 2021, pp. 1-14.

(Continued)

*Primary Examiner* — Syed Ali

(74) *Attorney, Agent, or Firm* — Kunzler Needham & Hilton

(57) ABSTRACT

Apparatuses, methods, and systems are disclosed for retransmitting a transport block with sidelink feedback not enabled. One method includes determining whether sidelink feedback is enabled for a transport block. The method includes, in response to the sidelink feedback being disabled for the transport block, retransmitting the transport block a predetermined number of times.

15 Claims, 7 Drawing Sheets

(56)                  References Cited

U.S. PATENT DOCUMENTS

| | | | |
|---|---|---|---|
| 2016/0157251 A1* | 6/2016 | Schliwa-Bertling .... | H04W 4/70 370/315 |
| 2016/0302100 A1* | 10/2016 | Kanamarlapudi .... | H04L 1/1854 |
| 2018/0196715 A1* | 7/2018 | Balasubramanian ......................... | G06F 11/2097 |
| 2018/0310202 A1* | 10/2018 | Löhr ..................... | H04W 76/27 |
| 2018/0368107 A1* | 12/2018 | Babaei ................. | H04W 76/00 |
| 2019/0215717 A1* | 7/2019 | Lee ....................... | H04W 72/21 |
| 2019/0393989 A1* | 12/2019 | Jung .................... | H04W 24/02 |
| 2020/0267729 A1* | 8/2020 | Kim ...................... | H04W 72/20 |
| 2020/0359441 A1* | 11/2020 | Yilmaz ................ | H04W 76/15 |
| 2021/0288747 A1* | 9/2021 | Yu ......................... | H04L 1/0003 |
| 2022/0021485 A1* | 1/2022 | Singh ................... | H04L 1/1819 |
| 2022/0078697 A1* | 3/2022 | Tseng ................... | H04W 72/21 |
| 2022/0141866 A1* | 5/2022 | Liu ....................... | H04L 5/0012 370/329 |
| 2022/0191835 A1* | 6/2022 | Lee ...................... | H04W 72/23 |
| 2022/0264533 A1* | 8/2022 | Zhang ................. | H04L 1/1812 |
| 2022/0338172 A1* | 10/2022 | Yoshioka ............. | H04W 72/20 |
| 2023/0036584 A1* | 2/2023 | Lee ...................... | H04L 1/1854 |

OTHER PUBLICATIONS

LG Electronics, "Discussion on physical layer procedures for NR sidelink", 3GPP TSG RAN WG1 Meeting #99 R1-1913237, Nov. 18-22, 2019, pp. 1-20.
Samsung, "On Resource Allocation for NR V2X Mode", 3GPP TSG RAN WG1 #99 R1-1912459, Nov. 18-22, 2019, pp. 1-10.
Samsung, "On Resource Allocation for NR V2X Mode 2", 3GPP TSG RAN WG1 #99 R1-1912460, Nov. 18-22, 2019, pp. 1-8.
Interdigital, "RAN2 aspects of HARQ for NR V2X", 3GPP RAN WG2 Meeting #107bis R2-1912869, Oct. 14-18, 2019, pp. 1-4.

* cited by examiner

100

104

104

102

104

102

102

200

300

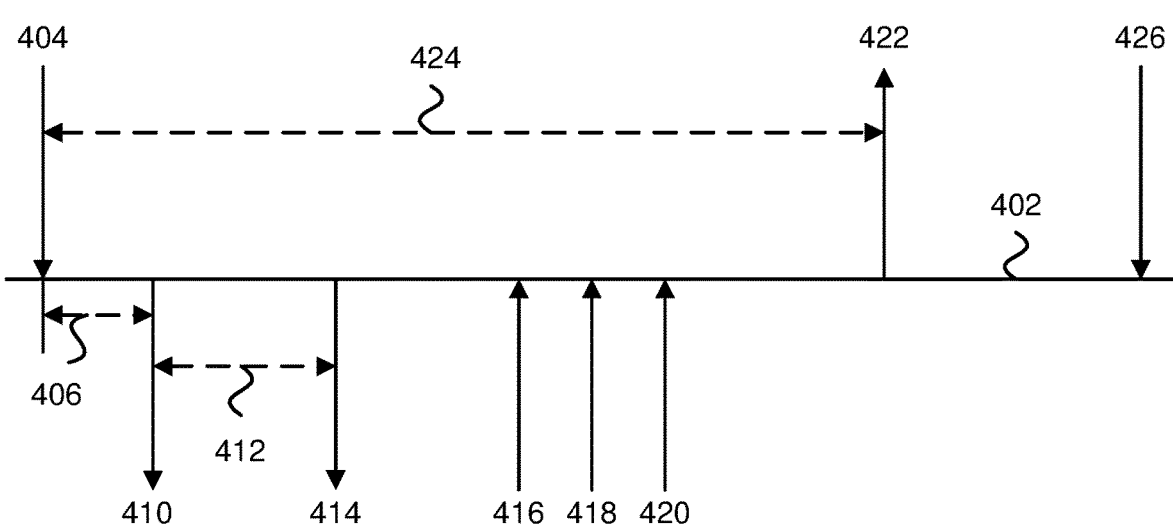
FIG. 4

500

600

| | Option 1 | Option 2 | Option 3 | Option 4 |
|---|---|---|---|---|
| HF disabled for the RB | Blind Retransmission | Blind Retransmission | Based on remaining PDB and reliability - TX UE determines whether to make BRs or feedback based retransmissions | Only 1 Tx (no retransmissions) |
| HF enabled for the RB | Based on remaining PDB and reliability TX UE determines whether to make BRs or feedback based retransmissions | Purely based on HF determined for the TB | | Based on remaining PDB and reliability - TX UE determines whether to make BRs or feedback based retransmissions |

RETRANSMITTING A TRANSPORT BLOCK WITH SIDELINK FEEDBACK NOT ENABLED

CROSS-REFERENCE TO RELATED APPLICATIONS

This application claims priority to U.S. Patent Application Ser. No. 62/961,821 entitled "APPARATUSES, METHODS, AND SYSTEMS FOR BLIND RETRANSMISSION IN NR V2X" and filed on Jan. 16, 2020 for Prateek Basu Mallick, which is incorporated herein by reference in its entirety.

FIELD

The subject matter disclosed herein relates generally to wireless communications and more particularly relates to retransmitting a transport block with sidelink feedback not enabled.

BACKGROUND

The following abbreviations are herewith defined, at least some of which are referred to within the following description: Third Generation Partnership Project ("3GPP"), 5$^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Blind Retransmission ("BR"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency

2

Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), HARQ Feedback ("HF"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Out-of-Order ("OOO"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Packet Delay Budget ("PDB"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Physical Sidelink Control Channel ("PSSCH"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), System-InformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Radio Bearer ("SLRB"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Transmitter User Equipment ("TX UE"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, sidelink feedback may be disabled.

BRIEF SUMMARY

Methods for retransmitting a transport block with sidelink feedback not enabled are disclosed. Apparatuses and systems also perform the functions of the methods. One embodiment of a method includes determining whether sidelink feedback is enabled for a transport block. In some embodiments, the method includes, in response to the sidelink feedback being disabled for the transport block, retransmitting the transport block a predetermined number of times.

One apparatus for retransmitting a transport block with sidelink feedback not enabled includes a processor that determines whether sidelink feedback is enabled for a transport block. In various embodiments, the apparatus includes a transmitter that, in response to the sidelink feedback being disabled for the transport block, retransmits the transport block a predetermined number of times.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a timing diagram illustrating one embodiment of feedback in response to receiving a SL grant;

FIG. 6 is a table illustrating one embodiment of different UE behaviors based on whether sidelink feedback is enabled.

DETAILED DESCRIPTION

Figure 1:
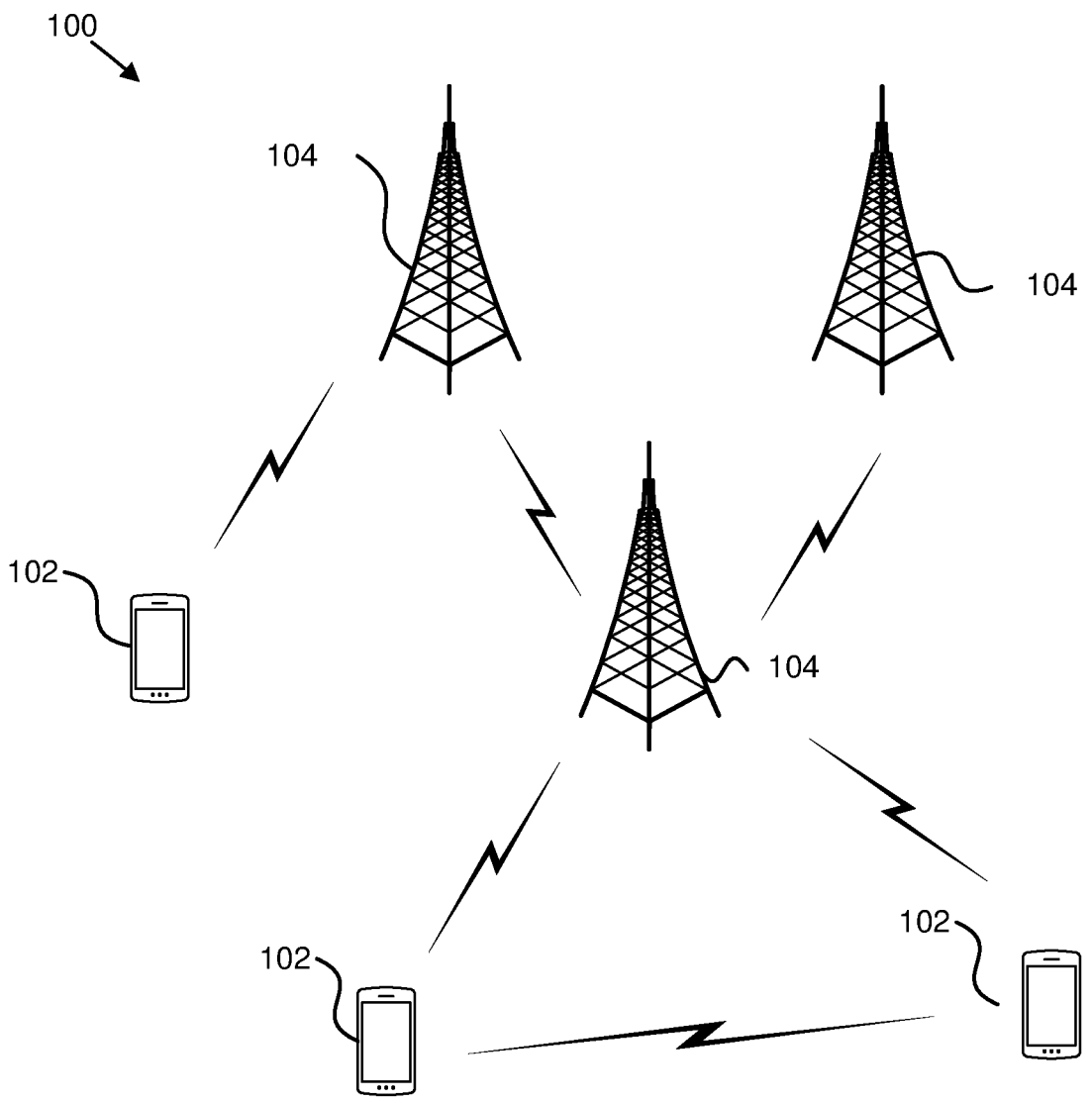
FIG. 1 is a schematic block diagram illustrating one embodiment of a wireless communication system for retransmitting a transport block with sidelink feedback not enabled.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for retransmitting a transport block with sidelink feedback not enabled. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 and/or a network unit 104 may determine whether sidelink feedback is enabled for a transport block. In some embodiments, the remote unit 102 and/or the network unit 104 may, in response to the sidelink feedback being disabled for the transport block, retransmit the transport block a predetermined number of times. Accordingly, the remote unit 102 and/or the network unit 104 may be used for retransmitting a transport block with sidelink feedback not enabled.

Figure 2:
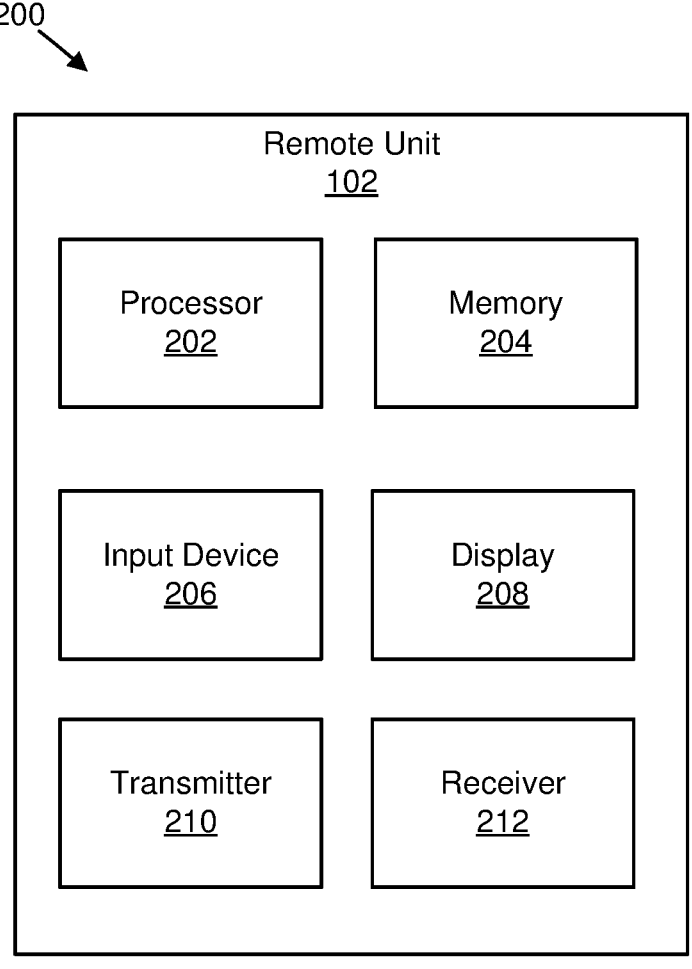
FIG. 2 is a schematic block diagram illustrating one embodiment of an apparatus that may be used for retransmitting a transport block with sidelink feedback not enabled.

FIG. 2 depicts one embodiment of an apparatus 200 that may be used for retransmitting a transport block with sidelink feedback not enabled. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the processor 202 may determine whether sidelink feedback is enabled for a transport block. In various embodiments, the transmitter 210 may, in response to the sidelink feedback being disabled for the transport block, retransmit the transport block a predetermined number of times.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
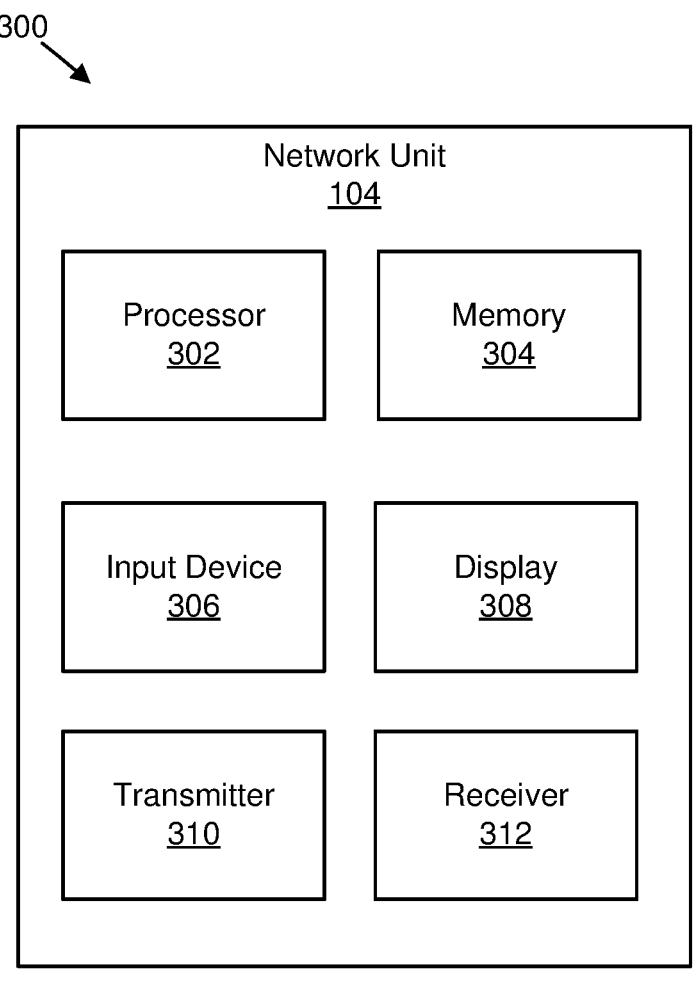
FIG. 3 is a schematic block diagram illustrating one embodiment of an apparatus that may be used for retransmitting a transport block with sidelink feedback not enabled.

FIG. 3 depicts one embodiment of an apparatus 300 that may be used for retransmitting a transport block with sidelink feedback not enabled. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the processor 302 may determine whether sidelink feedback is enabled for a transport block. In various embodiments, the transmitter 310 may, in response to the sidelink feedback being disabled for the transport block, retransmit the transport block a predetermined number of times.

In certain embodiments, if a gNB provides a Mode 1 based SL grant to a transmitter (TX) UE, which the TX UE uses to transmit data to one or more receiver UEs, the gNB may additionally provide PUCCH resources. These PUCCH resources may be used to send aggregated and/or combined feedback to the gNB. Based on the feedback received from the TX UE, the gNB may provide resources for a new transmission or for a retransmission of a current TB in transmission from the transmitter.

FIG. 4 is a timing diagram 400 illustrating one embodiment of feedback in response to receiving a SL grant. The timing diagram 400 illustrates signals that occur over time 402. At a first time 404 DCI is transmitted from a gNB to a TX UE. The DCI may include a PSCCH grant, a SL feedback grant on Uu, and so forth. A first time period 406 Ka may occur from the first time 404 to a second time 410. At the second time 410, SCI (e.g., PSCCH) may be transmitted from the TX UE to an RX UE. A second time period 412 Kb may occur from the second time 410 to a third time 414. At the third time 414, the TX UE may transmit PSSCH to the RX UE. At a fourth time 416, a fifth time 418, and/or a sixth time 420, a first RX UE may transmit feedback to the TX UE, a second RX UE may transmit feedback to the TX UE, and a third RX UE may transmit feedback to the TX UE, respectively. At a seventh time 422, the TX UE may transmit SL feedback to the gNB. A third time period 424 Kc may occur from the first time 404 to the seventh time 422. At an eighth time 426, the gNB may transmit DCI to the TX UE. The DCI may include a retransmission PSCCH grant, a SL feedback grant on Uu, and so forth.

In various embodiments, if a TX UE receives a SL grant from a gNB, the TX UE may prepare a TB to be sent out using the received SL grant. In some embodiments, there are various UE behaviors if a TX UE makes a number of determinations, such as whether the UE needs to make blind retransmissions instead of seeking feedback from receiver UEs on PC5.

In certain embodiments, blind retransmissions may be available in NR V2X communication. In various embodiments, a determination mechanism may be used to decide if blind retransmissions need to be made by a transmitter UE. In some embodiments, a transmitter UE operating in NR V2X Mode 1 may acquire a grant for retransmissions without first seeking feedback from receiver UEs.

In certain embodiments, there may be support for SL HARQ feedback to be enabled and/or disabled (e.g., configured in a SLRB level). This may be configured via an RRC message for both Mode 1 and Mode 2 UEs. In various embodiments, such as for idle, inactive, and/or OOC UEs, this may be configured in an SIB and/or a pre-configuration message.

In some embodiments, a meaning of "enable" and "disable" with respect to HARQ Feedback ("HF") may be unknown. In one embodiment, "enable" may mean that for a particular LCH, a TX UE is "allowed" to seek HARQ feedback from receivers but it may decide to not seek feedback. In another embodiment, "enable" may mean that once an LCH restriction for HF is set to "enable," a TX UE must seek feedback from receivers. In certain embodiments, "disable" may mean that a TX UE may only make one (e.g., a single) shot transmission of the corresponding data, or, in other embodiments, "disable" may mean that the TX UE makes a fixed number of transmissions and/or retransmissions of corresponding data without seeking feedback from receivers (e.g., blind transmissions and/or blind retransmissions). Because of different possible combinations of TX UE behaviors being possible, UEs may behave differently if there is not a uniform definition of "enable" and "disable." This may make a system inefficient or non-functional.

In various embodiments, a TX UE, upon receiving a SL grant from gNB, may use the received SL grant in a variety of ways. In one example, the TX UE decides for itself that it needs to seek feedback for a TB prepared for the received SL grant. In another example, the gNB indicates to the TX UE whether to seek feedback for the TB (e.g., in DCI containing the SL grant). In one embodiment, a gNB makes all determinations (e.g., feedback, blind retransmissions, etc.) and a TX UE follows the instructions from the gNB.

In certain embodiments, a gNB may decide everything including whether a UE is to make blind retransmissions. These decision in the gNB may be based on buffer status reporting ("BSR") made by the UE. In such embodiments, the gNB may not know how long a packet base been waiting in a UE buffer for transmission and it may be difficult for the gNB to judge whether feedback based retransmissions are to be made or whether a time remaining is small (e.g., remaining packet delay budget "PDB"). Further, in such embodiments, a capacity availability of a network node may be limited in its ability to control each aspect of sidelink communication if sidelink communications are widely deployed and/or used. As may be appreciated, network node control may be difficult to perform if short latencies need to be met (e.g., 3 ms).

In a first embodiment, there may be a new sequence of TX UE behavior that is executed once a SL grant (e.g., Mode 1 or Mode 2) becomes available.

Figure 5:
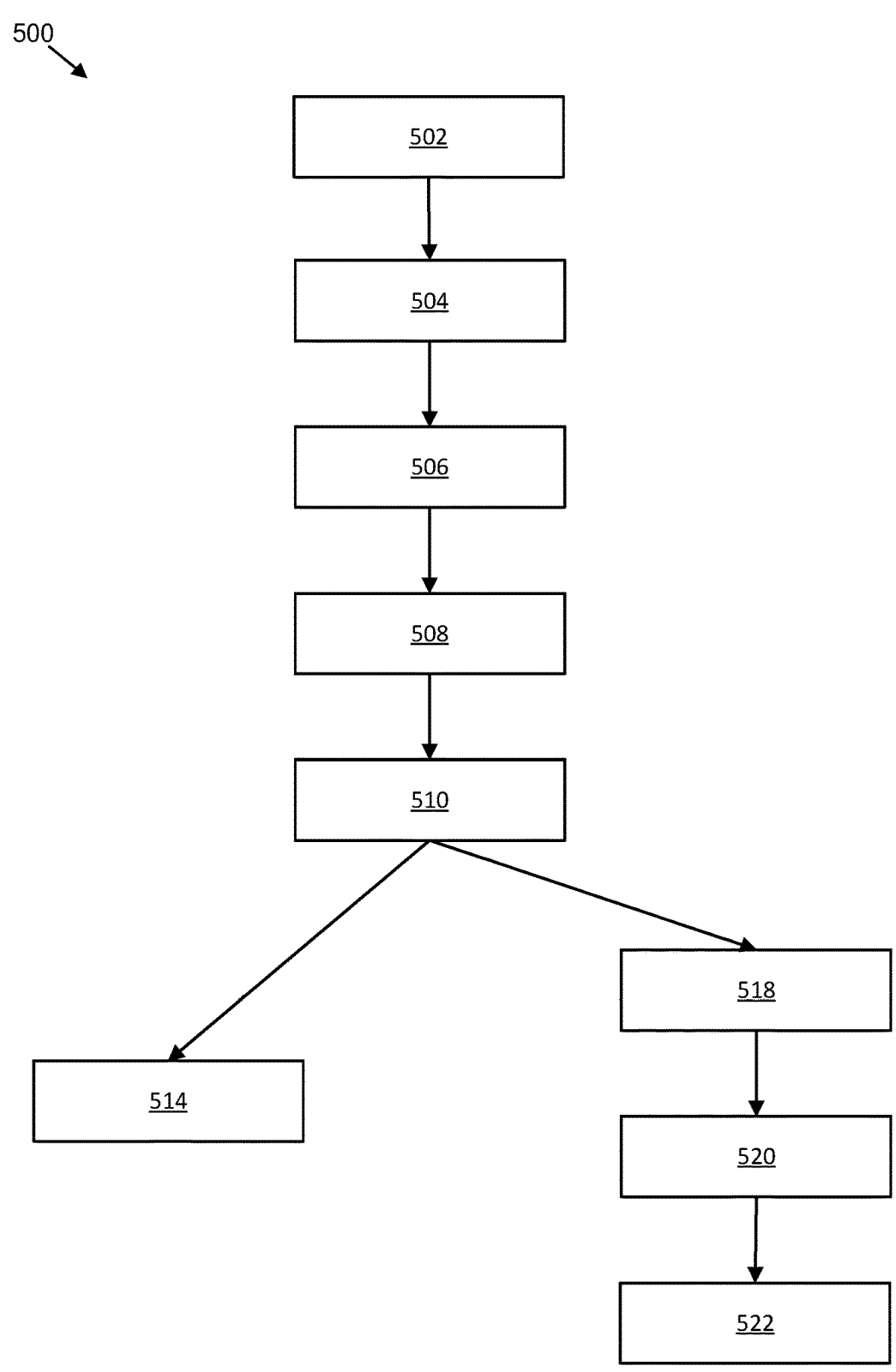
FIG. 5 is a flow chart diagram illustrating one embodiment of UE behaviors after a SL grant is received.

FIG. 5 is a flow chart diagram 500 illustrating one embodiment of UE behaviors after a SL grant is received. The steps described may be performed by a TX UE after it receives a SL grant.

In a first step 502, the TX UE may perform a first round of LCH restrictions (e.g., restrictions based on: cell restrictions, numerology, etc.).

In a second step 504, the TX UE may perform a destination selection based on highest priority logical channels across all destinations.

In a third step 506, a HF enabled and/or disabled status of a highest priority LCH for the second step 504 may be used by the TX UE to determine a HF enabled and/or disabled status for the entire TB.

In a fourth step 508, the TX UE may perform a second round of LCH restrictions in which the TX UE selects only those LCH abiding by the first step 502, the second step 504, and the third step 506 having the same feedback mode as determined for the entire TB. The LCP procedure may be run on the resulting LCHs.

In a fifth step 510, the TX UE may determine if BR is required for the TB as following: 1) the BR is performed whenever a HARQ feedback is determined as disabled for the TB; and/or 2) even when HARQ feedback is determined as enabled for the TB, the UE may still decide to perform blind retransmissions (e.g., based on a remaining PDB and/or required reliability—the highest reliability required by data of any of the LCH that is part of the TB).

In a sixth step 514, if BR is to be performed, the TX UE may submit the TB and a number of blind retransmissions (e.g., a configured value) to a lower and/or physical layer.

In a seventh step 518, if BR is not to be performed, the TX UE may determine if a HF option is to be used.

In an eighth step 520, the TX UE may determine a MCR.

In a nineth step 522, the TX UE may submit a TB, a HF option, and/or MCR to the lower and/or physical layer.

In various embodiments, a PUCCH resource is signaled to a TX UE, the TX UE may combine feedbacks from receiver UEs, and/or the TX UE may signal the combined feedback to a gNB.

In some embodiments, if a PUCCH resource for signaling combined PC5 HARQ feedback has been received by the TX UE from a gNB for a Mode 1 grant, and the TX UE has determined that blind retransmissions are to be made for a corresponding transmission, the TX UE may transmit the combined PC5 HARQ feedback as "NACK" without seeking and/or receiving HARQ feedback from its receivers. This may trigger the gNB providing resources for PC5 retransmission. In such embodiments, the transmitter may provide the combined PC5 HARQ feedback as "NACK" for further retransmissions as long as the packet delay budget (e.g., latency) of any or all of the data from any of the included logical channel is not exceeded or until a maximum number of blind retransmissions is not exceeded. As used herein, a "maximum number of blind retransmissions" may be configured, preconfigured, specified, or determined by UE implementation. In various embodiments, a last PC5 HARQ feedback sent to a gNB is always set to "ACK" so that the gNB stops providing resources for retransmission. In such embodiments, the TX UE determines the last combined PC5 HARQ feedback as the feedback corresponding to the last retransmission inside of the packet delay budget or the maximum number of blind retransmissions (e.g., last transmission is a transmission whose next potential retransmission would exceed at least one of these thresholds).

In certain embodiments, if PUCCH resources are not available (e.g., PUCCH resource for signaling the combined PC5 HARQ feedback has not been received by the TX UE from a gNB for a Mode 1 grant), a TX UE may autonomously switch to Mode 2 based resource acquisition for making either blind re-transmissions if it determines to make blind retransmissions for the corresponding TB or for making sidelink PC5 feedback based retransmissions.

FIG. 6 is a table 600 illustrating one embodiment of different UE behaviors based on whether sidelink feedback is enabled.

Specifically, FIG. 6 shows 4 different options for UE behavior depending on how a LCH (e.g., SLRB) configuration for HARQ feedback enabled and/or disabled are interpreted. In some embodiments, such as for each new transmission, a TX UE selects a destination having a logical channel with a highest priority (e.g., among the logical channels having data available for transmission and having no mapping restrictions to a sidelink grant). In such embodiments, a logical channel responsible for destination selection may determine if HARQ feedback for a TB is enabled or disabled. Therefore, in such embodiments, if the selected highest priority LCH has HARQ feedback enabled, LCP may take into account only the LCHs of the selected destination that have HARQ feedback enabled. On the other hand, if the selected highest priority LCH has HARQ feedback disabled, LCP may take into account only the LCHs of the selected destination that have HARQ feedback disabled. Accordingly, the HARQ feedback for the TB is determined as HF enabled or disabled according to the LCH (e.g., SLRB) configuration for HARQ feedback of the selected highest priority LCH.

In a first option (e.g., option 1) illustrated in FIG. 6, if the HARQ feedback for the TB is disabled, the TX UE may make a number of blind retransmissions. The number may be configured, preconfigured, specified, and/or based on UE implementation. In the first option illustrated in FIG. 6, if the HARQ feedback for the TB is enabled, the TX UE may evaluate whether blind transmissions or feedback based retransmissions are to be made based on a remaining PDB and a reliability of the selected logical channels in the TB.

In a second option (e.g., option 2) illustrated in FIG. 6, if the HARQ feedback for the TB is disabled, the TX UE may make a number of blind retransmissions. The number may be configured, preconfigured, specified, and/or based on UE implementation. In the second option illustrated in FIG. 6, if the HARQ feedback for the TB is enabled, the TX UE may decide to make feedback based HARQ retransmissions, may seek HARQ feedback from receiver UEs, and/or may provide necessary information in SCI (e.g., PSCCH).

In a third option (e.g., option 3) illustrated in FIG. 6, irrespective of HARQ feedback for the TB being enabled or disabled, the TX UE may evaluate whether blind transmissions or feedback based retransmissions are to be made based on a remaining PDB and a reliability of the selected logical channels in the TB.

In a fourth option (e.g., option 4) illustrated in FIG. 6, if the number of blind retransmission is fixed to 0, the TX UE makes one transmission of a TB (e.g., no retransmissions), does not seek any HARQ feedback from receivers, and then moves on to the next TB. In the fourth option illustrated in FIG. 6, if the HARQ feedback for the TB is enabled, the TX UE may evaluate whether blind transmissions or feedback based retransmissions are to be made based on a remaining PDB and a reliability of the selected logical channels in the TB.

In various embodiments, if a TX UE or a receiver UE does not have GPS capabilities at the time of a transmission and/or a reception, a distance between the transmitter and receiver may be assumed to be less than or equal to MCR. In certain embodiments, a feedback mechanism may run irrespective of an MCR value (e.g., signaled or not in SCI). In such embodiments, a receiver may feedback an "ACK" to the transmitter if it is successfully able to decode both PSCCH and PSSCH; otherwise, the receiver may feedback a "NACK." In certain embodiments, feedback signaling may be a DTX transmission (e.g., "ACK" may be signaled using a DTX transmission).

Figure 7:
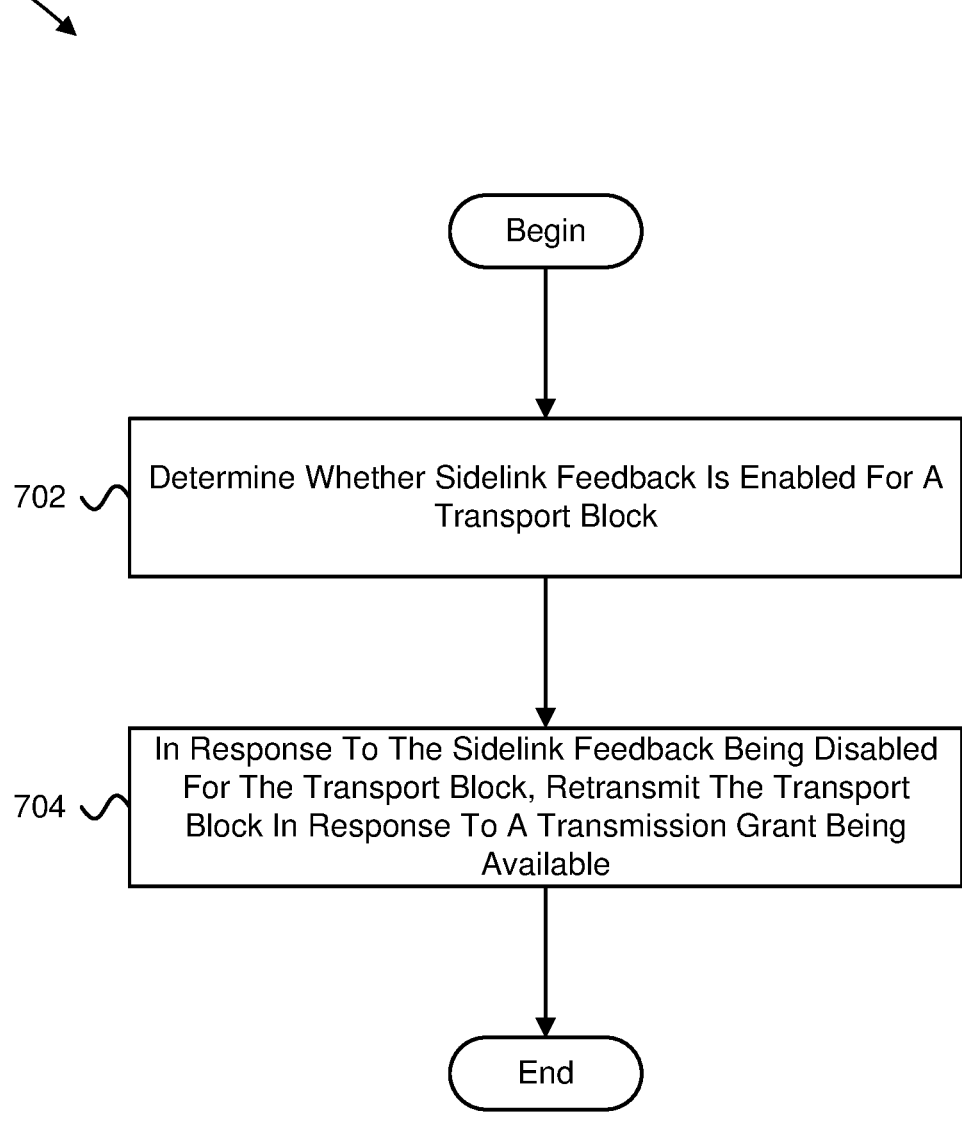
FIG. 7 is a flow chart diagram illustrating one embodiment of a method for retransmitting a transport block with sidelink feedback not enabled.

FIG. 7 is a flow chart diagram illustrating one embodiment of a method 700 for retransmitting a transport block with sidelink feedback not enabled. In some embodiments, the method 700 is performed by an apparatus, such as the remote unit 102 and/or the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes determining 702 whether sidelink feedback is enabled for a transport block. In some embodiments, the method 700 includes, in response to the sidelink feedback being disabled for the transport block, retransmitting 704 the transport block a predetermined number of times.

In certain embodiments, the method 700 further comprises, in response to the sidelink feedback being disabled for the transport block, transmitting a non-acknowledgment feedback to a network device on a physical uplink control channel In some embodiments, transmitting the non-acknowledgment feedback to the network device comprises transmitting the non-acknowledgment feedback to the network device after each transmission of the transport block except a last transmission of the transport block. In various embodiments, the method 700 further comprises transmitting an acknowledgment feedback on the physical uplink control channel to the network device after a last transmission of the transport block.

In one embodiment, the method 700 further comprises receiving resources for retransmitting the transport block in response to transmitting the non-acknowledgment feedback to the network device. In certain embodiments, the method 700 further comprises determining whether to retransmit the transport block. In some embodiments, determining whether to retransmit the transport block comprises determining whether to retransmit the transport block based on a remaining packet delay budget, a reliability factor, or a combination thereof.

In various embodiments, the method 700 further comprises, in response to the sidelink feedback being enabled for the transport block, determining what feedback to transmit to a network device. In one embodiment, determining what feedback to transmit to the network device comprises determining what feedback to transmit to the network device based on a remaining packet delay budget, a reliability factor, a number of remaining retransmissions, an availability of physical sidelink feedback channel resources, an availability of physical uplink control channel resources, or a combination thereof. In certain embodiments, the predetermined number of times is a maximum number of retransmissions after a first transmission has been made.

In one embodiment, a method comprises: determining whether sidelink feedback is enabled for a transport block; and in response to the sidelink feedback being disabled for the transport block, retransmitting the transport block a predetermined number of times.

In certain embodiments, the method further comprises, in response to the sidelink feedback being disabled for the transport block, transmitting a non-acknowledgment feedback to a network device on a physical uplink control channel.

In some embodiments, transmitting the non-acknowledgment feedback to the network device comprises transmitting the non-acknowledgment feedback to the network device after each transmission of the transport block except a last transmission of the transport block.

In various embodiments, the method further comprises transmitting an acknowledgment feedback on the physical uplink control channel to the network device after a last transmission of the transport block.

In one embodiment, the method further comprises receiving resources for retransmitting the transport block in response to transmitting the non-acknowledgment feedback to the network device.

In certain embodiments, the method further comprises determining whether to retransmit the transport block.

In some embodiments, determining whether to retransmit the transport block comprises determining whether to retransmit the transport block based on a remaining packet delay budget, a reliability factor, or a combination thereof.

In various embodiments, the method further comprises, in response to the sidelink feedback being enabled for the transport block, determining what feedback to transmit to a network device.

In one embodiment, determining what feedback to transmit to the network device comprises determining what feedback to transmit to the network device based on a remaining packet delay budget, a reliability factor, a number of remaining retransmissions, an availability of physical sidelink feedback channel resources, an availability of physical uplink control channel resources, or a combination thereof.

In certain embodiments, the predetermined number of times is a maximum number of retransmissions after a first transmission has been made.

In one embodiment, an apparatus comprises: a processor that determines whether sidelink feedback is enabled for a transport block; and a transmitter that, in response to the sidelink feedback being disabled for the transport block, retransmits the transport block a predetermined number of times.

In certain embodiments, the transmitter, in response to the sidelink feedback being disabled for the transport block, transmits a non-acknowledgment feedback to a network device on a physical uplink control channel In some embodiments, the transmitter transmitting the non-acknowledgment feedback to the network device comprises the transmitter transmitting the non-acknowledgment feedback to the network device after each transmission of the transport block except a last transmission of the transport block.

In various embodiments, the transmitter transmits an acknowledgment feedback on the physical uplink control channel to the network device after a last transmission of the transport block.

In one embodiment, the apparatus further comprises a receiver that receives resources for retransmitting the transport block in response to transmitting the non-acknowledgment feedback to the network device.

In certain embodiments, the processor determines whether to retransmit the transport block.

In some embodiments, the processor determining whether to retransmit the transport block comprises the processor determining whether to retransmit the transport block based on a remaining packet delay budget, a reliability factor, or a combination thereof.

In various embodiments, the processor, in response to the sidelink feedback being enabled for the transport block, determines what feedback to transmit to a network device.

In one embodiment, the processor determining what feedback to transmit to the network device comprises the processor determining what feedback to transmit to the network device based on a remaining packet delay budget, a reliability factor, a number of remaining retransmissions, an availability of physical sidelink feedback channel resources, an availability of physical uplink control channel resources, or a combination thereof.

In certain embodiments, the predetermined number of times is a maximum number of retransmissions after a first transmission has been made.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a logical channel (LCH) configuration that indicates whether sidelink feedback is enabled or disabled for a LCH;
   determining that sidelink feedback is disabled according to the received LCH configuration;
   in response to the sidelink feedback being disabled, retransmitting a transport block in response to a retransmission grant being available;
   in response to the sidelink feedback being disabled for the transport block, transmitting a non-acknowledgment (NACK) feedback to a network device on a physical uplink control channel (PUCCH); and
   receiving a grant for retransmitting in response to the NACK feedback, wherein the transport block is retransmitted a maximum number of retransmissions after a first transmission has been made.

2. The method of claim 1, wherein transmitting the NACK feedback to the network device comprises transmitting the NACK feedback to the network device after each transmission of the transport block except a last transmission of the transport block.

3. The method of claim 2, further comprising transmitting an acknowledgment (ACK) feedback on the PUCCH to the network device after the last transmission of the transport block.

4. The method of claim 1, further comprising determining whether to retransmit the transport block based on a remaining packet delay budget, or a reliability factor, or a combination thereof.

5. The method of claim 1, further comprising, in response to the sidelink feedback being enabled for the transport block, determining what feedback to transmit to a network device.

6. The method of claim 5, wherein determining what feedback to transmit to the network device comprises determining what feedback to transmit to the network device based on a remaining packet delay budget, a reliability factor, a number of remaining retransmissions, an availability of physical sidelink feedback channel (PSFCH) resources, or an availability of physical uplink control channel (PUCCH) resources, or a combination thereof.

7. A user equipment (UE), comprising:

at least one memory; and at least one processor coupled with the at least one memory and configured to cause the UE to:

receive a logical channel (LCH) configuration that indicates whether sidelink feedback is enabled or disabled for a LCH;

determine that sidelink feedback is disabled according to the received LCH configuration;

in response to the sidelink feedback being disabled, retransmit a transport block in response to a retransmission grant being available;

in response to the sidelink feedback being disabled for the transport block, transmit a non-acknowledgment (NACK) feedback to a network device on a physical uplink control channel (PUCCH); and receive a grant for retransmitting in response to the NACK feedback, wherein the transport block is retransmitted a maximum number of retransmissions after a first transmission has been made.

8. The UE of claim 7, wherein the at least one processor is configured to cause the UE to transmit the NACK feedback to the network device comprises transmitting the NACK feedback to the network device after each transmission of the transport block except a last transmission of the transport block.

9. The UE of claim 8, wherein the at least one processor is configured to cause the UE to transmit an acknowledgment (ACK) feedback on the PUCCH to the network device after a last transmission of the transport block.

10. The UE of claim 7, wherein the at least one processor is configured to cause the UE to determine whether to retransmit the transport block.

11. The UE of claim 10, wherein the at least one processor is configured to cause the UE to determine whether to retransmit the transport block comprises the processor determining whether to retransmit the transport block based on a remaining packet delay budget, or a reliability factor, or a combination thereof.

12. The UE of claim 7, wherein the at least one processor is configured to cause the UE to, in response to the sidelink feedback being enabled for the transport block, determine what feedback to transmit to a network device.

13. The UE of claim 12, wherein the at least one processor is configured to cause the UE to determine what feedback to transmit to the network device based on a remaining packet delay budget, a reliability factor, a number of remaining retransmissions, an availability of physical sidelink feedback channel resources, or an availability of physical uplink control channel resources, or a combination thereof.

14. A method performed by a base station, the method comprising:

transmitting a logical channel (LCH) configuration that indicates whether sidelink feedback is enabled or disabled for a LCH of a user equipment (UE);

receiving a non-acknowledgment (NACK) feedback from the UE in response to the sidelink feedback being disabled for the UE, wherein the NACK feedback is received after each transmission of the UE except a last transmission of the UE, wherein at least one transmission comprises a retransmission in response to a retransmission grant;

receiving an acknowledgment (ACK) feedback after the last transmission of the UE; and transmitting a grant for retransmitting in response to the NACK feedback, wherein a transport block is retransmitted a maximum number of retransmissions after a first transmission has been made.

15. A base station comprising:

at least one memory; and at least one processor coupled with the at least one memory and configured to cause the base station to:

transmit a logical channel (LCH) configuration that indicates whether sidelink feedback is enabled or disabled for a LCH of a user equipment (UE);

receive a non-acknowledgment (NACK) feedback from the UE in response to the sidelink feedback being disabled for the UE, wherein the NACK feedback is received after each transmission of the UE except a last transmission of the UE, wherein at least one transmission comprises a retransmission in response to a retransmission grant;

receive an acknowledgment (ACK) feedback after the last transmission of the UE; and transmit a grant for retransmitting in response to the NACK feedback, wherein a transport block is retransmitted a maximum number of retransmissions after a first transmission has been made.

* * * * *